United States Patent [19]
Collins

[11] Patent Number: 5,848,428
[45] Date of Patent: Dec. 8, 1998

[54] SENSE AMPLIFIER DECODING IN A MEMORY DEVICE TO REDUCE POWER CONSUMPTION

[75] Inventor: Michael J. Collins, Tomball, Tex.

[73] Assignee: Compaq Computer Corporation, Houston, Tex.

[21] Appl. No.: 770,763

[22] Filed: Dec. 19, 1996

[51] Int. Cl.[6] ................................................. G06F 12/00
[52] U.S. Cl. ........................ 711/127; 711/128; 711/129; 711/157; 711/154
[58] Field of Search .................................... 711/127, 128, 711/129, 157, 154; 365/233.5, 207; 360/65; 395/551

[56] References Cited

U.S. PATENT DOCUMENTS

| | | | |
|---|---|---|---|
| 4,633,434 | 12/1986 | Scheuneman | 395/551 |
| 5,572,468 | 11/1996 | Ishinabe et al. | |
| 5,596,740 | 1/1997 | Quattromani et al. | 711/157 |
| 5,623,377 | 4/1997 | Behrens et al. | 360/65 |
| 5,640,532 | 6/1997 | Thome et al. | 711/128 |

OTHER PUBLICATIONS

Sony CXK78V5862GB–50/60/66, pp. 1–40, Feb. 1995.
Intel® Pentium® Processor User's Manual, vol. 1: Pentium Processor Data Book, pp. 6–9 through 6–16, 1994.
The Cache Memory Book, pp. 62–72, 1993.
Motorola Semiconductor Technical Data, Motorola Fast SRAM Data, pp. 4–10 through 4–19, (199 ).

Primary Examiner—Tod R. Swann
Assistant Examiner—Mehdi Namazi
Attorney, Agent, or Firm—Pravel, Hewitt & Kimball

[57] ABSTRACT

A multiple-way cache memory system incorporating circuitry for selectively enabling the sense amplifiers in a given memory bank only when the memory bank contains data that is being accessed. In the disclosed embodiment of the invention, each bank of memory incorporates a bank of at least one sense amplifier that is enabled by a separate sense amplifier control signal. The sense amplifiers in each memory bank are controlled independent of the address decoding logic. Instead, the sense amplifier control signal for each memory bank is generated from tag RAM read hit information and read address data. Preferably, no more than one bank of sense amplifiers is enabled at a time, Power consumption in the cache memory system is thereby greatly reduced.

15 Claims, 6 Drawing Sheets

SENSE AMPLIFIER DECODING IN A MEMORY DEVICE TO REDUCE POWER CONSUMPTION

CROSS-REFERENCE TO RELATED APPLICATION

The present invention relates to improved cache memory for a computer system, as does commonly-owned U.S. patent application Ser. No. 08/743,501 entitled "A CACHE MEMORY USING UNIQUE BURST COUNTER CIRCUITRY AND ASYNCHRONOUS INTERLEAVED RAM BANKS FOR ZERO WAIT STATE OPERATION."

BACKGROUND OF THE INVENTION

1. Field of the Invention

The invention relates to computer systems employing cache memory, and more particularly to cache memory devices that selectively decode and disable unused sense amplifiers in order to reduce power consumption.

2. Description of the Related Art

The field of microcomputer design has seen tremendous advances in the past decade. Today's computer systems include multiple busses, extremely wide data paths, huge addressing spaces, and processor bus speeds well over 50 MHz. In the course of improving these computer systems, designers of both the chips and the systems themselves have resorted to cache technology to more efficiently couple the higher speed processors with lower speed memory. These caches have evolved into multiple level caches, with both data and code caches in the microprocessor, and a second level (L2) cache coupling the microprocessor host bus to slower speed system memory.

If a microprocessor requests memory data that is not available by the current cycle's end, the microprocessor must wait additional cycles for that data to become available. These additional cycles are known as wait states. The purpose of a cache is to eliminate wait states. The cache contains data that is frequently accessed by the microprocessor. A processor running at 50 MHz only has 20 nanoseconds (ns) per clock cycle, and only more expensive static random access memory (SRAM) can respond to memory operations in such a short time without requiring wait states. Main memory is usually implemented using less expensive dynamic random access memory (DRAM), which is slower and requires the processor to wait additional clock cycles for a response. By putting frequently accessed memory in the fast cache memory, the microprocessor can receive data from the cache instead of the slow DRAM during memory cycles. A cache thereby provides an intermediate source of faster memory, relatively smaller than main memory, that permits a processor to run with fewer wait states when the needed data is stored in the cache memory. In addition, when the processor is operating from cache memory, other bus masters can take advantage of the idle system bus. When requested data is not stored in the cache memory, a cache controller retrieves the data from main memory.

Cache design is well known to the computer arts, and includes a number of configurations. Two popular configurations are a direct mapped cache and a multiple-way cache. In a direct mapped cache, a certain portion of the memory address is stored in a cache tag RAM as a "tag". The tag is indicative of the block of main memory to which the data stored in the cache data SRAM corresponds. A second portion of the processor-provided memory address, known as the index (also called a "set"), then addresses the cache data SRAM when the corresponding tag in the tag RAM matches a valid tag portion of the processor address bus. For example, assume a simple memory system using 16-bit addressing, providing 64 kilobytes of memory. Assume that the high speed cache data SRAM provides 8 kilobytes of high speed cache memory. The lower 8 bits of the memory address then act as an index into both the cache data SRAM and the cache tag RAM, while the top 8 address bits are then stored in the indexed location in the tag RAM. When the microprocessor seeks to access a certain memory location, the top 8 address bits are compared to the data stored in the indexed location of the tag RAM. If the tag matches those bits, then the indexed cache data memory location contains the data from main memory corresponding to the processor-provided memory address.

The preceding example illustrates a direct mapped cache. A problem with direct mapped caches is evidenced when two memory locations are accessed which are one cache "page" apart—i.e., they have the same index--they could only occupy the same location in the cache data SRAM. Thus, on alternating accesses to such locations, the cache must be updated from or to main memory, resulting in a cache "miss".

To provide for a greater "hit" percentage, designers implemented multi-way set-associative caches. Typical examples include two-way and four-way set-associative caches. In a two-way cache, each cache index has two corresponding cache data SRAM storage locations (which are comprised of memory arrays) and two corresponding tags in the cache tag RAM. If one indexed "way" is already occupied by data corresponding to another tag, then the second can be used to store and retrieve the main memory data. When yet a third location of main memory needs to be stored in the cache, various algorithms are used to determine in which way of the cache to replace the data.

In a multiple-way set-associative cache, the index portion of the asserted address is latched into both the cache data and tag RAMs. When the cache tag RAMs returns a signal(s) indicating a hit to one of the ways, the output enable of the appropriate bank of cache data SRAM is enabled. But when running at 50 MHz or above, even the act of enabling the output buffers of the appropriate way of the cache can require a wait state. Cache designers have therefore implemented way prediction algorithms based on which way of the cache was most recently used. When an address is strobed onto the processor host bus by the processor for a read operation, the way prediction algorithm predicts which way is needed and enables that way's cache output enable. This occurs even before other more complicated circuitry determines which, if any, way is actually hit, saving precious time in enabling the output of the cache data SRAM.

Although advances in cache design have become incremental in recent years, the savings of even a single wait state is important to improving computer system performance. Even though cache data SRAMs are inherently faster than the DRAMs used for main memory, the aforementioned increases in processor bus clock rates have had the effect of taking away much of the timing margin necessary for reliable cache operation. Prior architectural techniques that provide zero wait states at 25 and 33 MHz, such as interleaved cache banks, have proven troublesome at 60MHz and above. The goal of zero-wait state read accesses at higher processor bus clock frequencies is made even more difficult when delays through the tag system are taken into account. Some RAM manufacturers have approached the problem by incorporating the burst counter and even the tag RAM on the same chip with the cache data SRAM, which relaxes the required access time by a few nanoseconds. Relatively fast SRAMs are still required, however.

With slower processor bus clock speeds, so-called flow-through burst SRAMs can be utilized. According to this topology, a memory address to be read is clocked into the data SRAM at the end of a first clock period (T1). In the next clock period (T2), data at the address in the SRAM core is retrieved and provided to the microprocessor through output buffers with enough timing margin to meet setup requirements. Flow-through burst SRAMs have proven adequate for processor bus clock frequencies up to 50 MHz, but become very expensive to manufacture for use at higher frequencies.

One approach that has been utilized to reduce pressure on SRAM manufacturing technology involves relaxing timing requirements by adding a wait state and implementing the cache system using so-called pipelined burst SRAMs. Under this architecture, the read address is clocked into the burst SRAM at the end of the first clock period T1. During the second clock period T2, data is retrieved from the data SRAM. The data is not immediately provided to the microprocessor as was the case with flow-through burst SRAMs, however, and does not need to meet rigid set-up time requirements. Following assertion of a hit signal from the tag RAM system, the data is instead synchronously clocked out to the processor bus during the next (third) clock period.

In the pipeline architecture, rather than using the address present on the address bus for immediately subsequent read accesses, addressing of the data SRAM is controlled by a burst counter. While one set of data is being latched out to the microprocessor, the next set is concurrently being retrieved from the data SRAM. In this manner, no additional wait states are incurred for subsequent data accesses. Using burst accesses with address pipelining has the advantage of reducing the access time required of the data SRAM from approximately 9 ns to 15 ns with a 66 MHZ clock. Much cheaper and easier to manufacture memory can be therefore be used. However, these types of synchronous burst SRAMs operate under the requirement of an additional wait state that measurably reduces computer system performance.

Power management has also become a key issue in highly integrated cache memory designs, particularly when the tag and data SRAMs are integrated into a single chip. The problem of power consumption is due in large part to the architecture of the SRAMs themselves. The main component of an SRAM (or DRAM) memory chip is the memory bit cell array. Typically, a bit is stored in an individually addressable unit memory bit cell, which is arranged with many other memory bit cells to form a matrix with rows and columns. The memory bit cells of a given row are enabled by a signal provided by a row decoder which receives the read address. In addition to receiving this signal, each memory bit cell is connected to a bit line pair. The number of these bit line pairs is equal to the number of columns in the array. When a memory bit cell is addressed, the bit line pair to which it is connected is coupled to a "read" or "input/output" bus by a column decoder.

In a typical SRAM chip layout, the read bus is shared by many columns and is therefore highly capacitive. In the interests of fast operation, voltage swings on the columns are kept relatively small to reduce capacitive effects. Minimizing voltage swings also reduces the required size of the memory bit cells. In order to detect the voltage swings on the bit lines and to aid in differential to single-ended voltage conversion, high gain sense amplifiers are employed to drive the outputs of the memory bit cells.

In prior SRAMs, all of the sense amplifiers in the chip are enabled by address decoding logic whenever valid data is detected and retrieved. The majority of dissipated power in SRAMs can be attributed to these sense amplifiers, In high-speed, highly integrated memory chips requiring many sense amplifiers, the magnitude of this power consumption can reach undesirable levels.

SUMMARY OF THE INVENTION

Briefly, a cache memory according to the invention incorporates circuitry for selectively enabling the sense amplifiers in a given memory bank only when the memory bank contains valid data that is being accessed. By disabling all other sense amplifiers in the data SRAM during this time, power consumption is greatly reduced. The disclosed embodiment of the invention is described as part of an improved burst cache memory that utilizes specialized burst counter circuitry to provide zero-wait-state operation.

In the interleaved 4-way set associative cache of the disclosed embodiment, each way contains an even bank and an odd bank of memory. Each even bank and each odd bank of memory incorporate a bank of one or more sense amplifiers that is enabled by a separate sense amplifier control signal. The present invention minimizes memory power dissipation by controlling the sense amplifiers in each memory bank independent of the address decoding logic. Instead, the sense amplifier control signal of each memory bank is controlled by tag RAM read hit information and read address data.

When an initial read address of a burst access becomes valid, the tag RAM and tag address comparator immediately begin examining each way to determine if it contains data corresponding to the read address. If valid data is detected, the tag address comparator asserts a way hit signal indicating a cache hit to the corresponding way. Only one way hit signal is asserted at a time. For the first portion of the read data, the process of examining the ways and asserting a way hit signal is completed well before the data is provided to the processor data bus. Asserting the way hit signal at this early stage provides timing margin necessary for proper control of the sense amplifiers during zero-wait state operation.

One of the lower order read address bits is utilized in conjunction with the way hit signal to assert the sense amplifier control signal for either the odd or the even bank of memory in the valid way, depending on which is addressed first. This sense amplifier control signal is maintained asserted until the first portion of the read data has been provided to the processor data bus, and deasserted shortly thereafter. For the remainder of the burst access, subsequent sense amplifier control signals are generated in a synchronous fashion that corresponds to a processor-specific burst ordering scheme. Preferably, no more than one bank of sense amplifiers is enabled at a time. Power consumption in the cache memory system is thereby greatly reduced.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
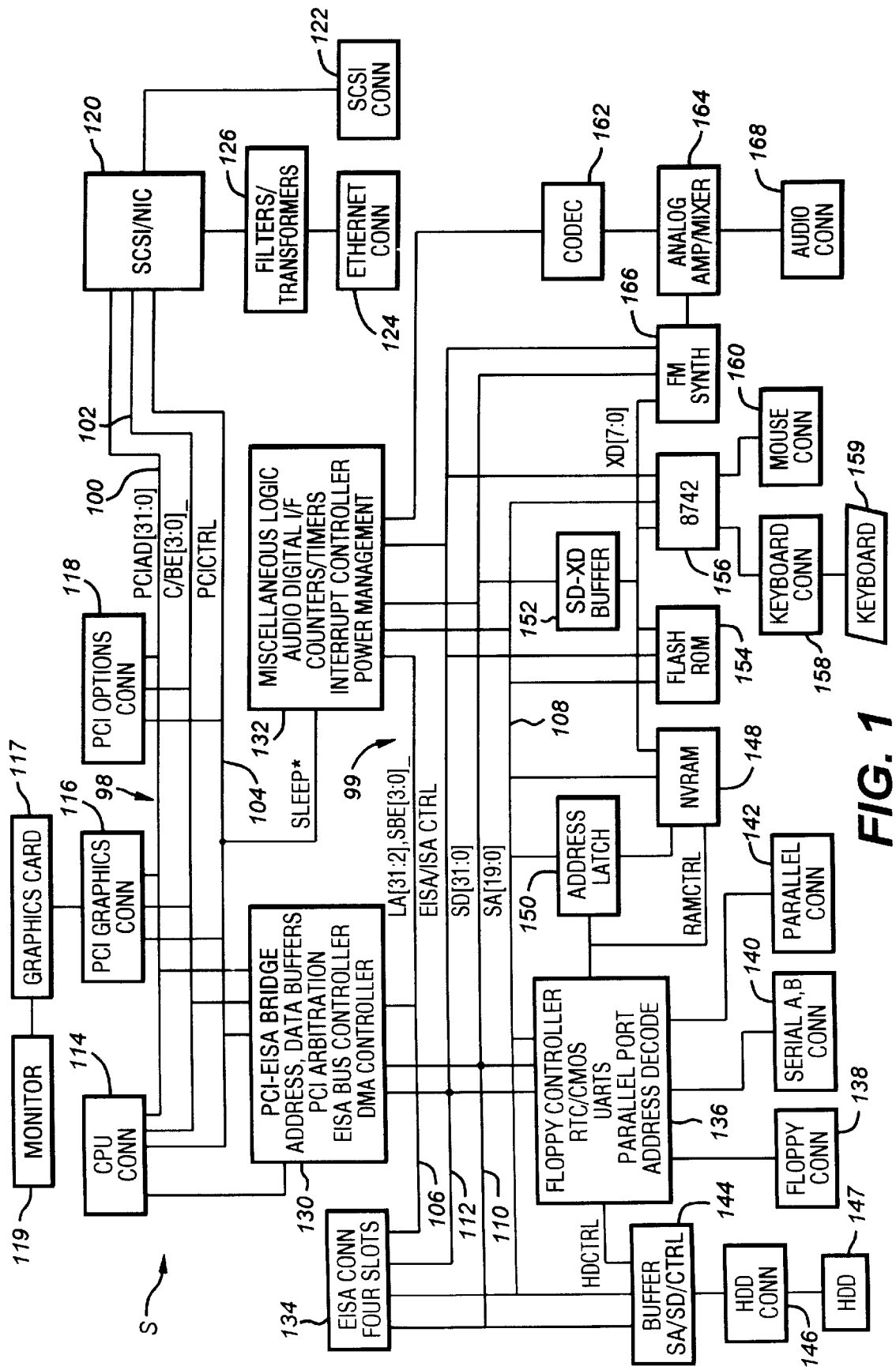
FIG. 1 is a block diagram of a system board of a computer system according to the preferred embodiment.

Turning now to the drawings, FIG. 1 shows the system board S of a computer system according to the present invention. The system board S contains circuitry and slots for receiving interchangeable circuit boards. In the preferred embodiment, there are two primary buses located on the system board S. The first bus is the PCI or Peripheral Component Interconnect bus P which includes an address/data portion 100, a control and byte enable portion 102 and a control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbone of the system board S.

Figure 2:
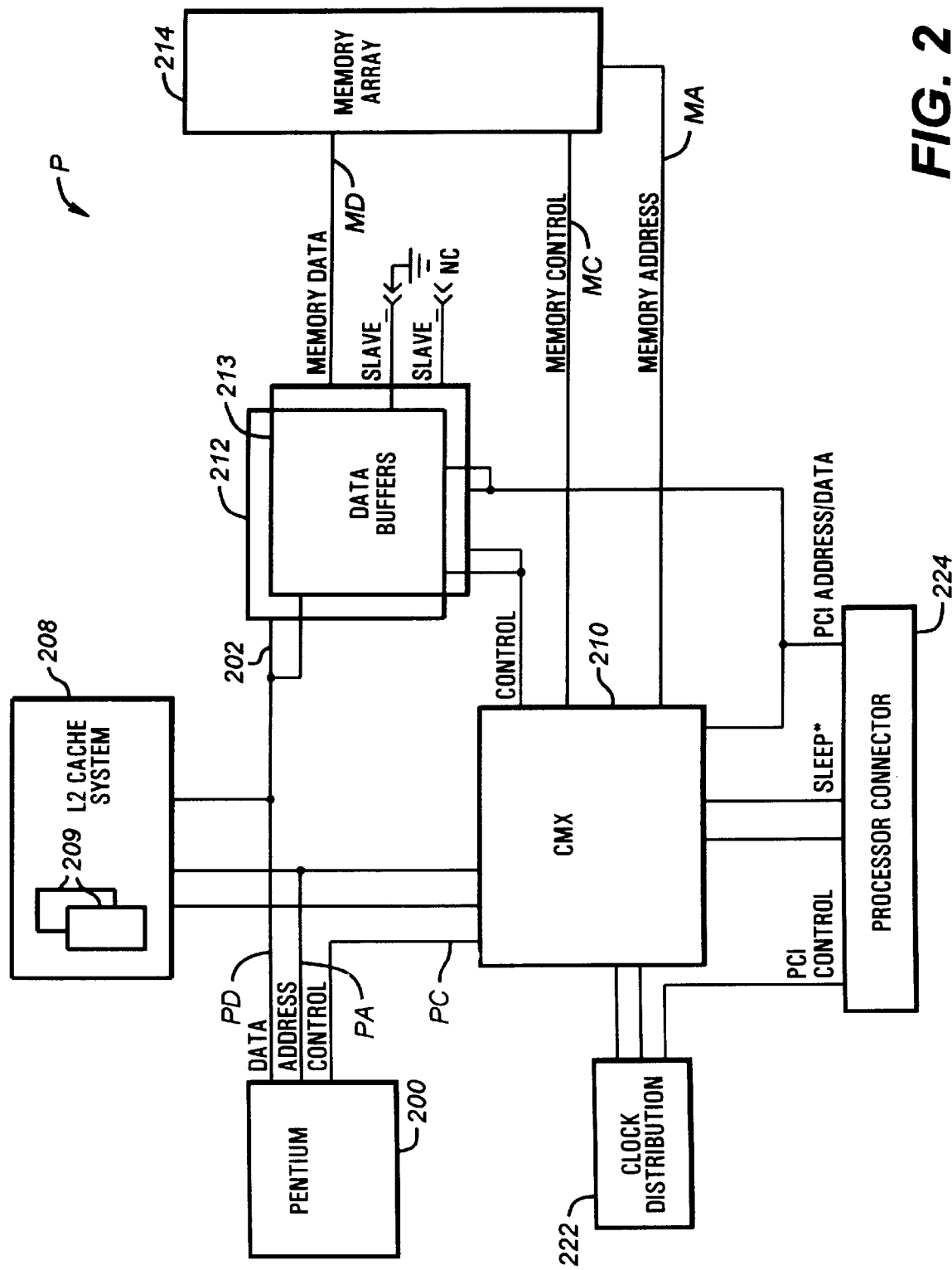
FIG. 2 is a block diagram of a processor board according to the present invention for use with the computer system of FIG. 1.

A CPU connector 114 is connected to the PCI bus 98 to receive a processor card, such as that shown in FIG. 2. A PCI graphics connector 116 is connected to the PCI bus 98 to receive a video graphics card 117. The graphics card provides video signals to an external monitor 119. A PCI option connector 118 is also connected to the PCI bus 98 to receive any additional cards designed according to the PCI standard. In addition, a SCSI and network interface (NIC) controller 120 is connected to the PCI bus 98. Preferably, the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives, CD-ROM drives, or other mass data storage devices (not shown). An Ethernet connector 124 is provided on the system board S and is connected to filter and transformer circuitry 126, which in turn is connected to the controller 120. This forms a network or Ethernet connection for connecting the system board S and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus 99. In the preferred embodiment, the miscellaneous system logic chip 132 is implemented as an application specific integrated circuit (ASIC). The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry.

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port 140 connectors are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive 147 or other mass data storage device. A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 for receiving a keyboard 159, and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

Referring now to FIG. 2, a processor board P for use with the system board S is shown. In the processor board P, the CPU or microprocessor 200 is preferably the 64-bit Pentium® P54 processor from Intel®, versions of which operate at numerous internal clock frequencies. The microprocessor 200 can also be a 32-bit Pentium® P24 processor or a 486 DX4 processor, also from Intel®. Other similar processors may be utilized. The microprocessor 200 is connected to a processor bus 202 having data, address and control portions PD, PA and PC. When used with the Pentium® P54 processor, the width of the data bus PD is 64 bits. With the Pentium® P24 processor or the 486 DX4 processor, the width of the bus PD is 32 bits.

The microprocessor 200 includes an internal or L1 cache memory. A level 2 (L2) or external cache memory system 208 is connected to the processor bus 202 to provide additional caching capabilities to improve performance of the computer system. A processor cache and memory controller (CMX) and PCI bridge chip 210 is connected to the control portion PC and to the address portion PA. The CMX 210 receives the signal SLEEP* provided by the miscellaneous logic chip 132 to place the microprocessor 200 into low power mode. The CMX 210 also controls data buffers 212 and 213. Additionally, the CMX 210 provides control signals MC and address signals MA to a main memory 214. The control signals MC include various RAS* and CAS* signals. The CMX 210 is also connected to the L2 cache system 208, as it incorporates the cache controller, and therefore, controls the operations of cache memory devices 209 in the L2 cache system 208. The cache memory devices 209 are implemented with static random access memories (SRAMs). For the 32-bit processors, cache memory sizes of 128K or 256K bytes are supported, with the cache line width being 16 bytes. For the 64-bit processors, cache sizes of 256K and 512K bytes are supported, with the cache line width being 32 bytes. Note that certain signals in the computer system S are physically manifested as active low signals. That is, when the physical signal is at a logic low level, it is considered true. Such signals are generally designated by being followed with an asterisk, "*", or a pound sign, "#".

The CMX 210 also supports either asynchronous (standard) or synchronous (burst) SRAMs as the cache data SRAMs. When the microprocessor 200 is implemented with one of the Pentium® processors, burst SRAMs 209 are used to enable operation at 50 MHz, 60 MHz or 66 MHz. As described more fully below in conjunction with FIG. 4, a burst SRAM 209 according to the invention includes a 2-bit counter for incrementing burst addresses during a burst cycle.

Every memory read and write operation undertaken by the microprocessor 200 is examined to determine whether the cycle is addressing a location currently allocated inside an SRAM 209. If the read or write request can be satisfied completely within the SRAM 209 and there is no need to broadcast the cycle to the rest of the computer system, the SRAM 209 completes the cycle with the microprocessor 200. The CMX 210 is configured to execute all cycles which the cache memory system 208 cannot complete. These cycles include all I/O cycles, all special cycles and cache miss cycles, and certain hit cycles which require the cycle to be run in the rest of the computer system.

The L2 cache memory system 208 supports both the writethrough and writeback cache consistency protocols. If the writethrough protocol is used, all writes to the L2 cache memory 208 are written back to main memory 214 to maintain coherency between the L2 cache 208 and main memory 214. The writeback cache uses the MESI (Modified/Exclusive/Shared/Invalid) protocol, as is well known in the art. The L2 cache memory 208 write policy is determined by the state of a bit in a configuration register. When set, this bit indicates a writeback policy; if cleared, a writethrough policy is implemented. Configuration cycles are provided for on the PCI bus 98 to allow for software driven initialization and configuration of PCI bus devices in a separate address space. For more information on PCI configuration cycles, refer to the PCI Specification 2.1 from the PCI Special Interest Group in care of Intel® Corporation, which is hereby incorporated by reference.

The data buffers 212 and 213, which are preferably implemented with ASICs, are connected between the processor data bus PD and the memory data bus MD provided by the memory array 214. The data buffers 212 and 213 are also connected to the PCI address and data bus PCIAD through a connector 224, which is provided to be mateably received by the processor connector 114. The data buffers 212 and 213 are connected to various control signals from the CMX 210.

The data buffers 212 and 213 each include a SLAVE_ input. As shown, the SLAVE_input to the data buffer 212 is tied to ground and the SLAVE_input of the data buffer 213 is not connected, the input being pulled high by an internal pull-up resistor. The data buffer 212 is referred to as the slave data buffer, and the data buffer 213 is referred to as the master data buffer. Each data buffer receives half the data bits from the processor, memory and PCI data buses PD, MD, and PCIAD, respectively.

Clock distribution and generation circuitry 222 is associated with the processor card P and is connected to the CMX 210. The clock distribution circuitry 222 provides a clock CLK to the processor bus 202. The processor connector 224 is connected to the CMX 210 and the clock distribution circuitry 222 to provide clocks to the computer system and to provide a PCI interface to allow the microprocessor 200 to access the PCI and EISA buses 98 and 99 and to allow PCI and EISA bus masters to access the main memory array 214. The PCI address and data are multiplexed on the bus PCIAD, with the address provided during the address phase and data provided during the data phase.

Figure 3:
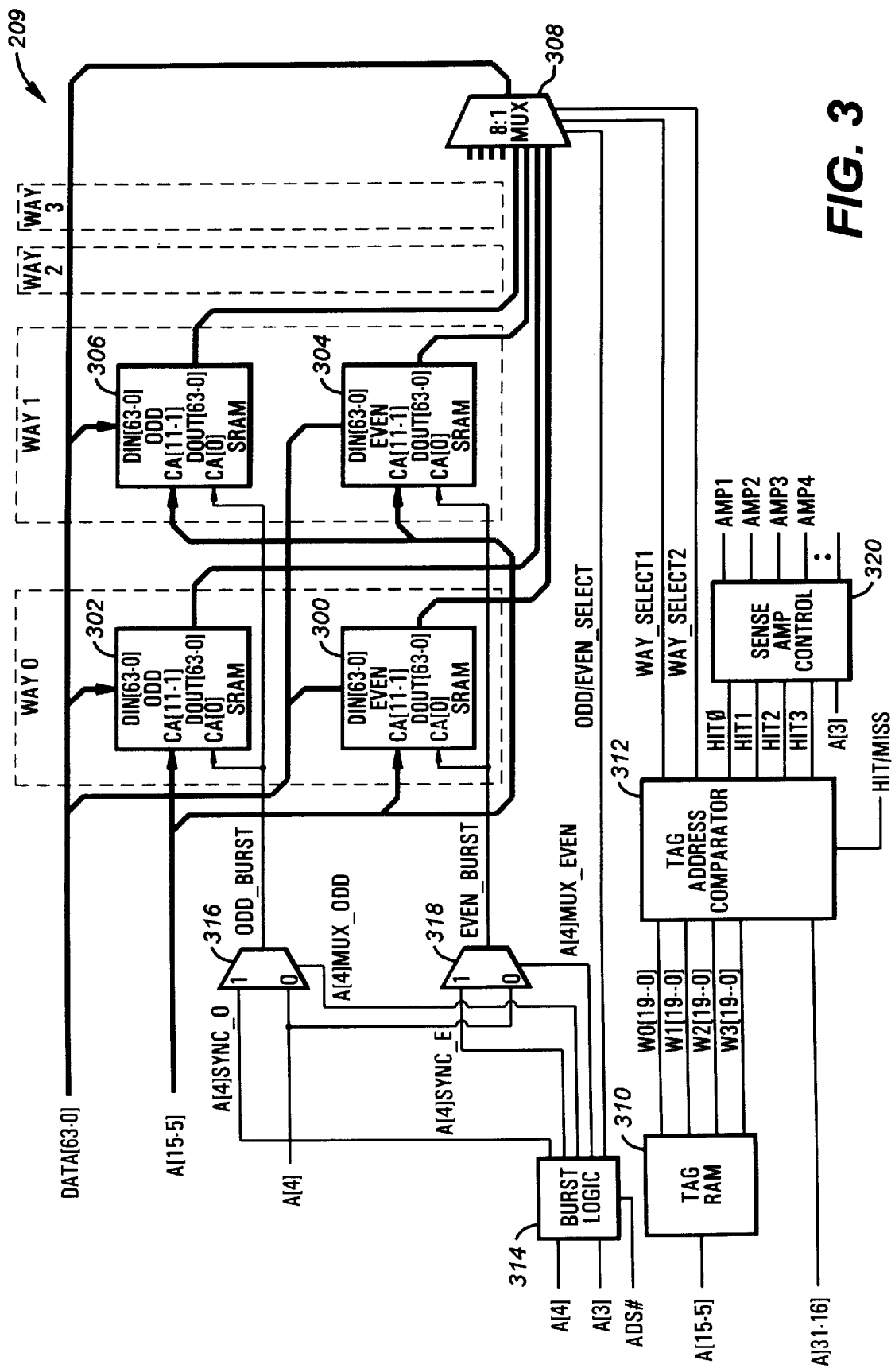
FIG. 3 is a schematic block diagram illustrating an interleaved four-way cache implemented according to the invention.

Referring now to FIG. 3, a schematic block diagram illustrating a cache SRAM 209 of the cache memory system 208 implemented according to the invention is shown. The disclosed embodiment of the invention is described as part of an improved burst cache SRAM that utilizes specialized burst counter circuitry to provide zero-wait-state operation as described in co-pending U.S. patent application Ser. No. 08/743,501, entitled "A CACHE MEMORY USING UNIQUE BURST COUNTER CIRCUITRY AND ASYNCHRONOUS INTERLEAVED RAM BANKS FOR ZERO WAIT STATE OPERATION", hereby incorporated by reference. In the preferred embodiment, the SRAM 209 is organized as an interleaved 4-way set associative single-chip 128K bytes (4×4K×64) secondary data cache, where the capacity is given according to the formula: ways×sets×cache line size (in bits). The 128K byte SRAM 209 is cascadable to 256K bytes, 4-way set associative providing zero-wait-state read and write cache hit cycles at 50, 60 and 66 MHz. The four ways of the SRAM 209 are denoted as WAY 0, WAY 1, WAY 2 and WAY 3 and hereinafter collectively referred to as "ways". The disclosed SRAM 209 also incorporates an on-board tag RAM 310 (4×512×20).

Alternatively, the cache memory system 208 can be organized as one or two single-chip, 256K bytes interleaved 4-way set associative (4×8K×64) data SRAMs 209 incorporating an on-board tag RAM 310 of 4×1K×19. Many other L2 cache system 208 configurations are also possible, and it is understood that the exact sizes of the various memory arrays are not critical to the invention. Further, it is contemplated that the invention could be implemented in a multi-way cache system that is not interleaved. Although not shown for sake of clarity, the SRAM 209 also preferably incorporates a 3.3 V input/output (I/O) interface, control logic, boundary scan testing support and a low power standby mode with data retention.

The ways of the L2 cache memory system 208 (as well as the main memory array 214) are organized into even and odd banks of memory, with each bank holding as many bits per location as the number of data wires in the processor data bus PD. For a system based on the 386DX or 486 processors from Intel Corporation, the bank width is usually 32 bits. For a Pentium®-based system the bank width is usually 64 bits, or 72 bits when parity bits or Error Correcting Code (ECC) bits are counted. Throughout the remainder of this specification, the bank width is assumed to be 64 bits. In the disclosed embodiment of the invention, WAY 0 is comprised of EVEN and ODD memory banks 300 and 302, while WAY 1 is comprised of EVEN and ODD memory banks 304 and 306. Preferably, each of the memory banks 300, 302, 304, 306 incorporate asynchronous address decoders. The identically configured memory banks of WAY 3 and WAY 4 are not shown for sake of clarity.

Interleaved memory access refers to the practice of arranging memory arrays or chips such that all the even addresses are in one bank of memory (or group of banks) and all of the odd addresses are in another. The L2 cache memory system 208 must therefore have an even number of banks of memory in order to use interleaved memory access. As discussed more fully below in conjunction with FIG. 5, memory addresses can then be alternated between the even bank(s) and the odd bank(s) such that memory accessed in order of location in memory address space is accessed alternately from an even bank and from an odd bank.

The DIN[63-0] bits of each of the memory banks 300, 302, 304 and 306 of the SRAM 209 are coupled to the DATA[63-0] bits of the processor data bus PD for receiving cacheable write data. In addition, the DOUT[63-0] outputs of each of the memory banks 300, 302, 304 and 306 are individually provided to inputs of an 8:1 multiplexor 308 that selectively couples cache line data to the processor data bus PD during read cycles. Further, the A[15-5] bits of the processor address bus are coupled to the CA[11-1] inputs of each of the memory banks 300, 302, 304 and 306.

To detect if data addressed by the microprocessor 200 (or various PCI bus masters) during a memory cycle is located in the L2 cache memory system 208, each SRAM 209 includes a tag RAM 310. The high speed tag RAM 310 cooperates with a tag address comparator 312 that permits quick determination of hits to data blocks inside the ways. Depending on the size and associativity of the L2 cache memory system 208, portions of processor address bus PA are used to index to a cache line in each tag RAM 310.

In the embodiment of FIG. 3, for example, processor address bits A[15:5] are received by the tag RAM 310 and are used to index an entry in each way. Each index entry (also referred to as a "tag address") in each of the four ways of the tag RAM 310 generally contains a label and at least two state bits for each stored line in the data cache. As is known in the art, the state bits may be utilized to implement the MESI protocol, which is used to maintain cache data consistency in multi-cache systems. Additional state bits could be stored to implement other protocols. Further, the depth of the tag RAM 310 can be reduced by a factor of two by using one of the tag address bits (preferably A[5]) as a line select bit. One tag address then corresponds to two cache data lines. This technique is often referred to as "sectoring", and can be used with additional bits in a tag address to further reduce the required depth of the tag RAM 310.

In the disclosed configuration the label is comprised of the remaining address bits, which correspond to stored cache data entries. Although the labels shown are comprised of the 16 most significant bits of the address bus A[31-16], it is recognized that fewer bits could be used if the computer system S does not utilize all of the available address space. When a cacheable read cycle is initiated, the tag RAM 310 provides the indexed label for each way to the tag address comparator 312. These labels and four associated state bits are communicated over signal lines W0[19-0], W1[19-0], W2[19-0] and W3[19-0] as shown in FIG. 3.

The tag address comparator 312 then compares the labels to the current processor address bits A[31:16] to determine if a match occurs. If the labels match, the state bits corresponding to the selected line are examined to determine the state of the cache line. If the state bits indicate a valid cache data entry, a cache "hit" is indicated by assertion of a cache hit signal HIT/MISS, which is provided to cache control logic (not shown). Way select signals $WAY_{13}$ SELECT1 and WAY_SELECT2 are also provided from the tag address comparator 312 to two of the control inputs of the 8:1 multiplexor 308 that connects the data memory array outputs to the processor data bus PD. These way select signals WAY_SELECT 1 and WAY_SELECT2 are asserted to enable the outputs of the way 1–4 that contains the requested quad-word of data.

Of significance in the disclosed embodiment of the invention, the tag address comparator 312 also provides a series of way hit signals HIT0, HIT1, HIT2, and HIT3 to a sense amplifier control circuit 320. Assertion of a particular way hit signal indicates a cache hit to a corresponding way. For example, assertion of the way hit signal HIT0 indicates that a requested quad-word of data is stored within one of the memory banks 300 or 302 of WAY0. Only one of the way hit signals HIT0, HIT1, HIT2 or HIT3 may be asserted at any given time. The sense amplifier control circuit 320 also receives the processor address bit A[3]. This address bit, in conjunction with the way hit signals, is used to generate sense amplifier control signals AMP1, AMP2, AMP3, and AMP4. Details of the sense amplifier control circuit 320 are provided in FIG. 6A.

Figure 4:
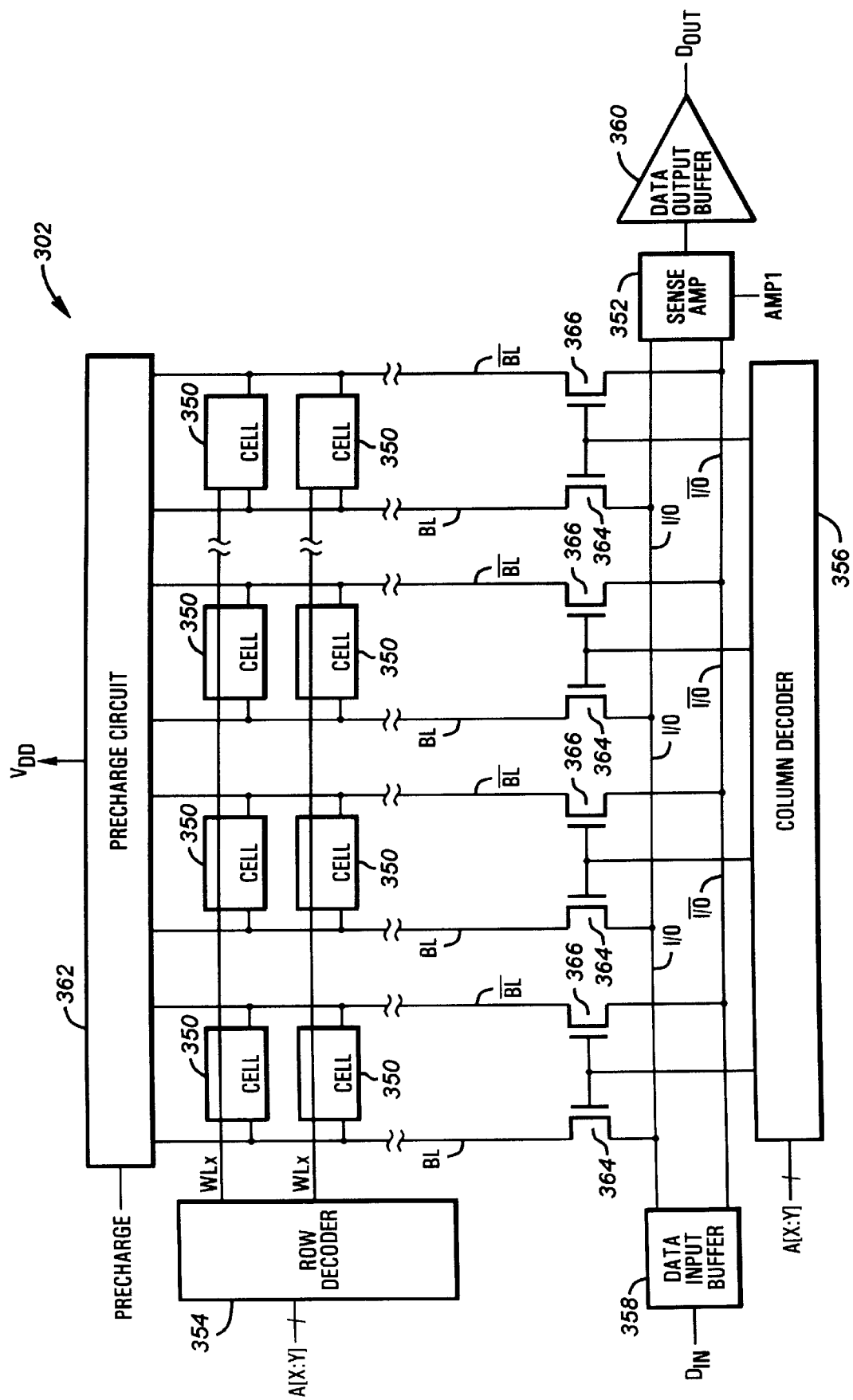
FIG. 4 is a block diagram providing details of a memory array of FIG. 3.

As shown in more detail in FIG. 4, each of the memory banks 300, 302, 304, and 306 incorporate a bank of one or more sense amplifiers 352. Thus, in an interleaved SRAM 209 having four ways, there are a total of eight banks of sense amplifiers 352. These sense amplifiers 352, while a necessary component of effective SRAMs 209, are a major source of power consumption in the cache memory system 208. In order to enable a particular bank of sense amplifiers 352 only when it is needed, each bank receives one of the sense amplifier control signals generated by the sense amplifier control circuit 320. In the disclosed embodiment, memory bank 302 receives sense amplifier control signal AMP1, memory bank 300 receives sense amplifier control signal AMP2, memory bank 306 receives sense amplifier control signal AMP3, and memory bank 304 receives sense amplifier control signal AMP4. Although not shown, WAY 2 and WAY 3 also receive sense amplifier control signals generated by the sense amplifier control circuit 320. The timing relationship between the sense amplifier control signals AMP1, AMP2, AMP3 and AMP4 is detailed in FIG. 6B.

Most of today's processors are configured to complete all cacheable read cycles in burst mode. With the extension of the data bus to 64 bits, a typical burst cycle transfers 32 bytes in four bus cycles of 8 bytes (64 bits) each. These bytes are contiguous, and are aligned to 32-byte boundaries corresponding to cache lines of the on-chip L1 caches. Because a burst cycle is limited to an address area which begins at a 32-byte boundary, the three other burst addresses are also implicitly known. Burst logic 314 is therefore provided to independently calculate the other three burst addresses—obviating the need to decode further address signals from the microprocessor 200 and incur additional wait states.

With the Pentium® processor, the address sequence in burst mode is fixed dependent on the first address. This is necessary because the first address given out by the Pentium® need not necessarily defined a 32-byte boundary; it can lie anywhere in the address space and generally defines the line most immediately needed by the processor. The fixed address sequences supported by the Pentium® processor are described more fully below in conjunction with FIG. 5, and are also described in the Intel Pentium® Processor User's Manual, Volume 1 1994, pp. 6–13 through 6–16, which is incorporated by reference. In general, burst ordering is defined in a Pentium® processor to satisfy a number of requirements. First, the initial addressed quad-word is read/written. Second, the second addressed quad-word is to the same low order bit address (i.e., A[4] remains the same), but to the opposite odd/even bank. Third, each successive quad-word is read/written to alternating odd/even banks. This choice of burst ordering simplifies the burst logic for interleaved memory accesses.

In order to determine the required address sequence, burst logic 314 is provided with processor address bits A[4] and A[3] and an address strobe signal ADS∩. In particular, address bit A[4] identifies the initial quad-word that is addressed, while address bit A[3] specifies whether the initial quad-word is in the even bank or the odd bank. The burst logic 314 communicates an addressing signal A[4] SYNC_O to the "1" input of a first 2:1 multiplexor 316 and an addressing signal A[4]SYNC_E to the "1" input of a second 2:1 multiplexor 318. The burst logic 314 also provides an odd or even bank select signal ODD/EVEN_ SELECT to one of the control inputs of the 8:1 multiplexor 308. The select input of the multiplexor 318 is driven by a multiplexor control output signal A[4]MUX_EVEN signal supplied by the burst logic 314. Similarly, the select input of the multiplexor 316 is driven by a multiplexor control output signal A[4]MUX_ODD from the burst logic 314. The "0" input of each of the multiplexors 316 and 318 is coupled to the processor address bit A[4].

The output of the first 2:1 multiplexor 316 communicates a cache line select signal ODD_BURST to the low-order address inputs CA[0] of the odd memory banks 302 and 306, while the output of the second 2:1 multiplexor 318 communicates a cache line select signal EVEN_BURST to the low-order address inputs CA[0] of the even memory banks 300 and 304. As described below in conjunction with FIG. 5, during the first clock cycle T1 of a burst read cycle the multiplexors 316 and 318 and the burst logic 314 cooperate to drive the initial low-order order address input CA[0] of each bank of memory asynchronously, but to then drive that input synchronously during subsequent clock cycles T2.

Referring now to FIG. 4, details of a representative memory bank 302 are provided. Each memory bank is comprised of an array of memory bit cells 350. Each memory bit cell 350 is capable of holding a bit of data. In a typical SRAM 209, the memory bit cells 350 generally consist of a flip-flop type circuit (generally a 4-transistor cell, not shown), the circuit condition of which represents the stored value. This type of memory bit cell structure is more complicated and larger than that of a DRAM, but has the advantage of being much faster. The SRAM memory bit cell is static in nature and—unlike a DRAM memory bit cell—does not require repetitive refresh cycles.

Each of the addressable memory bit cells 350 is arranged with other memory bit cells 350 in the form of a matrix with rows and columns. The memory bit cells 350 of a given row are connected to a word line WLx supplied by a row decoder 354. The array of memory bit cells 350 accommodates as many word lines WLx as rows are formed. In addition, each of the memory bit cells 350 is connected to a bit line pair BL and $\overline{BL}$. The number of these bit line pairs BL and $\overline{BL}$ is equal to the number of columns in the array of memory bit cells 350. Each of the bit line pairs BL and $\overline{BL}$ are alternately connected to the sources of a dedicated pair of pass transistors 364 and 366. The drain of each of the pass transistors 364 is connected to an input/output line I/O, while the drains of the pass transistors 366 are connected to a complimentary input/output line $\overline{I/O}$. The gates of each opposing pair of pass transistors 364 and 366 are connected and individually coupled to a signal line driven by a column decoder 356.

In a typical SRAM 209 chip layout, the input/output lines I/O and $\overline{I/O}$ are shared by many columns and are therefore highly capacitive. In the interests of fast operation, voltage swings produced by the memory bit cells 350 on the columns are kept relatively small to reduce capacitive effects. In order to detect these voltage swings on the bit lines BL and $\overline{BL}$ and to perform differential to single-ended voltage conversion, high gain sense amplifiers 352 are employed to drive the output of any valid column. By adding a bank of at least one sense amplifier 352, the memory bit cell 350 sizes can also be reduced since they will only sink current from the bit line pairs BL and $\overline{BL}$.

In the disclosed embodiment, a bank of at least one sense amplifier 352 is provided across the input/output lines I/O and $\overline{I/O}$ to amplify the potential difference on the these lines. The bank of sense amplifiers 352 functions to supply an amplified version of the storage signal provided to the input/output lines I/O and $\overline{I/O}$ by an enabled pair of corresponding pass transistors 364 and 366. Each sense amplifier 352 is activated by one of the sense amplifier control signals, shown as AMP1 in FIG. 4. When the signal AMP1 is deasserted, the sense amplifier 352 is either turned off or enters a low-power mode. As noted, a majority of the power consumed by the SRAM 209 is typically dissipated in these sense amplifiers 352. The internal architecture of the sense amplifiers 352 is not critical to the invention.

When a read address A[X:Y] is provided to the SRAM 209 during a cache read cycle, the row decoder activates a corresponding word line WLx. After stabilization of the data on the bit line pairs BL and $\overline{BL}$, the column decoder 356 selects the column corresponding to the supplied address A[X:Y] and activates exactly one pass transistor pair 364 and 366. This means that the data of only one memory bit cell 350 is transmitted to the input/output line pair I/O and $\overline{I/O}$ for communication to the sense amplifier 352. The differential voltage is converted to a single-ended voltage by the sense amplifier 352 and provided to the input of a data output buffer 360. The data output buffer 360 supplies a buffered version of the bit stored in the accessed memory bit cell 350 as an output signal DOUT. The output signal DOUT is connected to the processor data bus PD.

A data write operation proceeds in an opposite manner and commences when a write address A[X:Y] and write data DIN are provided to the SRAM 209. The write data DIN is provided to the input/output line pair I/O and $\overline{I/O}$ via a data input buffer 358. Addressing of the proper memory bit cell is accomplished in two steps. First, the column decoder 356 activates the appropriate pass transistor pair 364 and 366 to supply the write data signal DIN to the bit line pair BL and $\overline{BL}$. At the same time, the row decoder 354 activates a word line WLx and turns on one of the memory bit cells 350. Because the sense amplifier 352 is electrically stronger than the memory bit cell 350, the data provided to the bit line pair BL and $\overline{BL}$ by the sense amplifier 352 (through a pass transistor pair 364 and 366) is stored in the memory bit cell 350. Therefore, the addressed memory bit cell 350 switches according to the new write data signal DIN, or keeps the already stored value depending upon whether the write data coincides with the stored data. The write data signal DIN is also connected to the processor data bus PD.

If needed, a precharge circuit 362 is connected to each of the bit line pairs BL, $\overline{BL}$. The precharge circuit 362, which is controlled by a signal PRECHARGE, functions to raise the voltage on both bit line BL and $\overline{BL}$. This operation guarantees that the voltage on only one bit line BL or $\overline{BL}$ switches to a logic low level during the write operation, thereby conserving power as is known in the industry. It is also noted that the memory bank 302 arrangement detailed in FIG. 4 is exemplary and could take many forms. The precise implementation is not critical to the invention.

Figure 5:
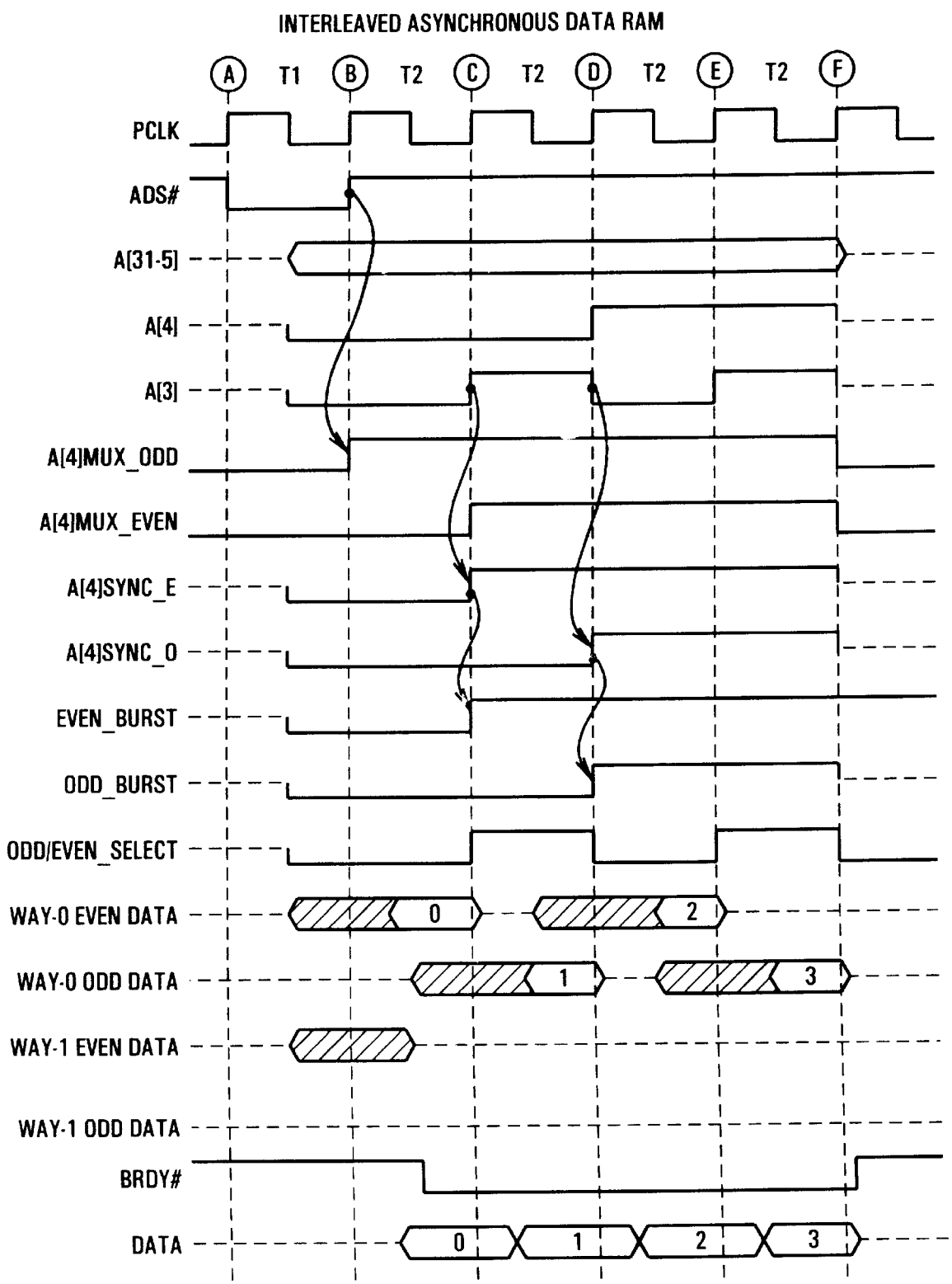
FIG. 5 is a timing diagram illustrating a burst read cycle according to the invention.

Referring now to FIG. 5, a timing diagram illustrating a burst read cycle according to the invention is shown. In prior art synchronous or burst SRAMs, burst cycles are initiated by asserting the address strobe signal ADS* during the initial clock cycle T1 beginning at time A. The initial burst address is typically strobed into the SRAM at the rising edge of the address strobe signal ADS* at time B. The address strobe signal ADS* is normally asserted by either the microprocessor 200 or the CMX 210. Typical asynchronous SRAMs, on the other hand, do not include an address strobe input. Instead, they have an address latch input for latching in the external address.

In an asynchronous SRAM 209 according to the invention, the initial burst address is not strobed into the memory banks 300, 302, 304 and 306 in a synchronous fashion. At some point between time A and time B, the initial burst address becomes valid. During this T1 clock cycle, the burst logic 314 maintains the multiplexor control output signals A[4]MUX_EVEN and A[4]MUX_ODD at logic low levels, such that the "0" inputs to the multiplexors 316 and 318 (i.e., the A[4] address bit) are provided to the CA[0] inputs of the memory banks 300, 302, 304 and 306 in an asynchronous fashion. In this manner, the memory arrays begin accessing the addressed data as soon as the read address is present, without waiting for the rising edge of the address strobe signal ADS#. Many nanoseconds of timing margin are thereby added to the address-to-data access timing budget.

At time B, the rising edge of the address strobe signal ADS# triggers "synchronous" operation of the SRAM 209. The multiplexor control signal A[4]MUX_ODD provided by the burst logic 314 is asserted at this point, such that the "1" input to the multiplexor 316 is provided to the CA[0] inputs of the memory banks 302 and 306. Stated another way, the addressing signal A[4]SYNC_O becomes the cache line select signal ODD_BURST. Addressing of subsequent odd quad-words of data can thereby be controlled in a "synchronous" fashion by the burst logic 314.

The multiplexor control signal A[4]MUX_EVEN is not asserted until time C in the disclosed embodiment. While A[4]MUX_EVEN is asserted, the addressing signal A[4]SYNC_E is provided by the multiplexor 318 to the CA[0] inputs of the memory banks 300 and 304. If A[4]MUX_EVEN is asserted prior to the first quadword of data being provided to the processor data bus PD, the potential exists for a switching glitch at the output of the multiplexor 318 to be seen at the CA[0] input of the even memory banks. Delaying the assertion of A[4]MUX_EVEN until time C does not negatively impact cache performance, as the memory bank 300 is still allowed almost two full processor clock PCLK cycles to access the next even quad-word word. In the event that the first addressed quad-word is stored in an odd memory bank, A[4]MUX_EVEN is asserted at time B while A[4]MUX_ODD is not asserted until time C.

As mentioned, a burst read access can begin at any one of four quad-word addresses. The following table provides exemplary addressing:

|  | EVEN QUAD-WORD 0 | ODD QUAD-WORD 1 | EVEN QUAD-WORD 2 | ODD QUAD-WORD 3 |
| --- | --- | --- | --- | --- |
| ADDR[4] | 0 | 0 | 1 | 1 |
| ADDR[3] | 0 | 1 | 0 | 1 |

After the initial burst address is registered, the three subsequent addresses are generated by the burst logic 314. The subsequent address are incremented according to a burst ordering scheme shown in one of the two following tables:

| (Pentium ® Burst Sequence) | | | |
| --- | --- | --- | --- |
| FIRST | SECOND | THIRD | FOURTH |
| 0 | 1 | 2 | 3 |
| 1 | 0 | 3 | 2 |
| 2 | 3 | 0 | 1 |
| 3 | 2 | 1 | 0 | or,

| (Linear Burst Sequence) | | | |
| --- | --- | --- | --- |
| FIRST | SECOND | THIRD | FOURTH |
| 0 | 1 | 2 | 3 |
| 1 | 2 | 3 | 0 |
| 2 | 3 | 0 | 1 |
| 3 | 0 | 1 | 2 |

Note that in both the Pentium Burst Sequence and the Linear Burst Sequence, data is accessed alternately from an even bank and from an odd bank, although the control logic is slightly more complicated for the Linear Burst Sequence.

In a burst sequence according to FIG. 5, even quad-word 0 of WAY 0 is the first quad-word provided to the processor data bus PD. The data setup and hold time Tsetup required of the SRAM 209 is typically in the 4–5 ns range. Even quad-word 0 must therefore be valid at least ~4 ns before the rising edge of the processor clock PCLK at time C. Shortly after quad-word 0 is clocked out to the processor data bus PD at time C, the addressing signal A[4]SYNC_E is asserted so that the memory bank 300 can begin accessing the even quad-word 2. Quad-word 2 is not provided to the processor address bus until time E, thus the memory bank 302 is allowed two full processor clock PCLK cycles—minus the data setup and hold time Tsetup—to respond. In similar fashion, the addressing signal A[4]SYNC_O is held at a logic low level until quad-word 1 is clocked out to the processor data bus PD at time D, and is asserted immediately thereafter. Zero-wait state operation is thus maintained throughout the burst read cycle.

At time C, the odd or even bank select signal ODD/EVEN_SELECT transitions such that the output of the odd memory bank 302 is provided to the processor data bus PD by the 8:1 multiplexor 308 on the next rising edge of the processor clock PCLK. The bank select signal ODD/EVEN_SELECT transitions in a similar manner at times D and E for quad-words 2 and 3.

As shown in FIG. 5, both WAY 0 even memory bank 300 and WAY 1 even memory bank 304 are enabled during the initial clock cycle T1 by address bit A[4]. Both of the memory banks remain powered on until a way is selected by the tag address comparator 312. Assuming that WAY 0 is selected, WAY 1 and any other way can be disabled to conserve power.

According to the invention, the burst ready signal BRDY* is asserted at some point between time B and time C to indicate the beginning of a burst cycle. The signal BRDY* is then deasserted following completion of the burst cycle at time F. For the Pentium® P54 processor, the signal BRDY* is used to indicate completion of all bus cycles. However, for the 486 DX4 or Pentium® P24 processors, the signal BRDY* indicates the completion of a burst cycle and the signal RDY* (not shown) indicates the completion of non-burst cycles.

Figure 6A:
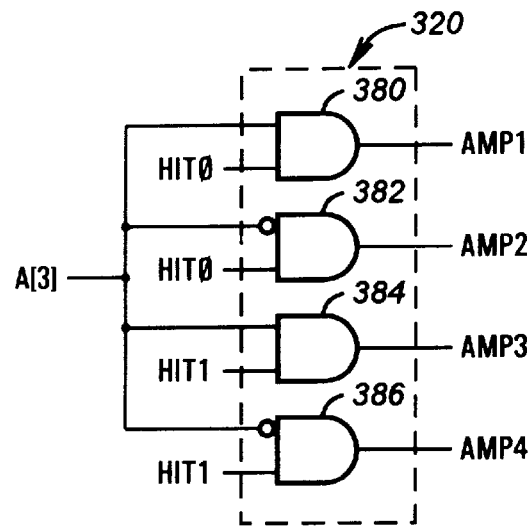
FIG. 6A is a schematic diagram showing details of the sense amplifier control circuitry of FIG. 5.
Figure 6B:
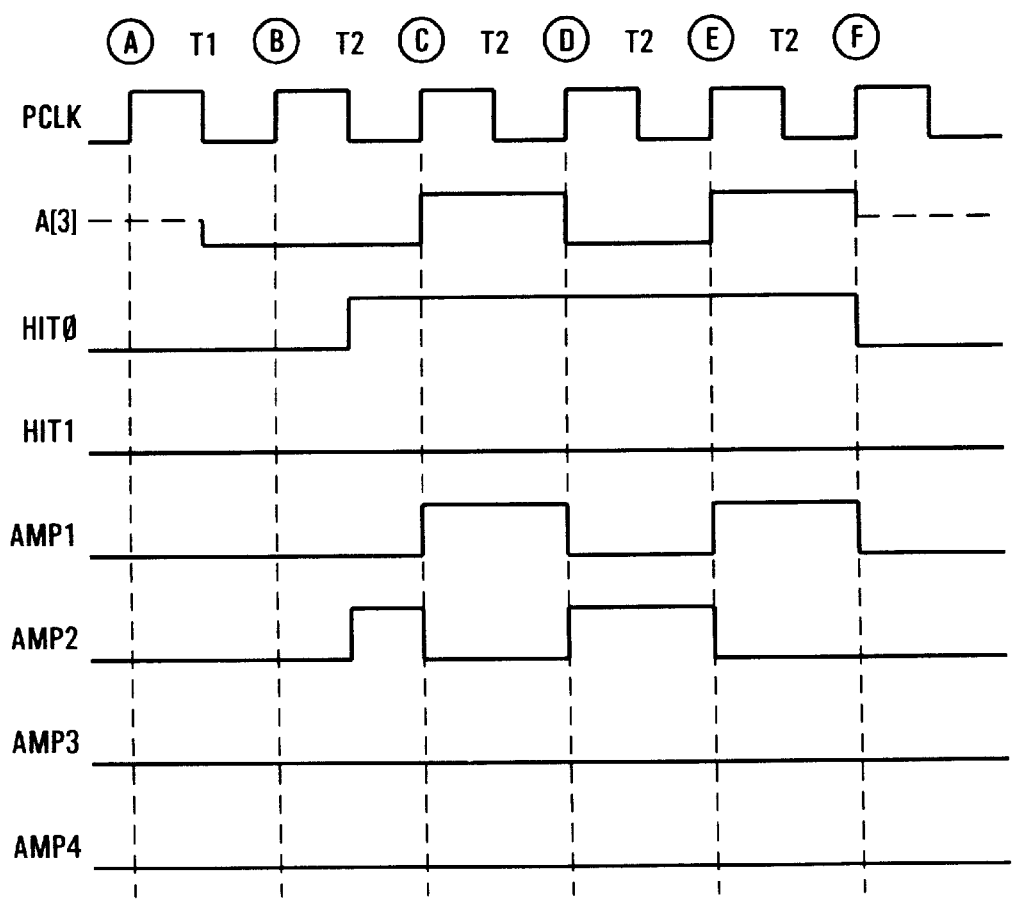
FIG. 6B is a timing diagram illustrating the timing relationship between the sense amplifier control signals.

Turning now to FIGS. 6A and 6B, the generation and timing relationship of the sense amplifier control signals AMP1, AMP2, AMP3 and AMP4 is shown. More specifically, the sense amplifier control circuit 320 is detailed in FIG. 6A. The sense amplifiers 352 of the odd memory banks 302 and 306 are controlled by signals AMP1 and AMP3, respectively, while the sense amplifiers 352 of the even memory banks 300 and 304 are controlled by signals AMP2 and AMP4.

Sense amplifier control signal AMP1 is provided by the output of a two input AND gate 380, whose inputs include the address bit A[3] and the way hit signal HIT0. Likewise, sense amplifier control signal AMP3 is provided by the output of a two input AND gate 384, whose inputs include the address bit A[3] and the way hit signal HIT1. Sense amplifier control signal AMP2 is furnished by the output of an AND gate 382. The inputs to this AND gate 382 include an inverted version of the address bit A[3] and the way hit signal HIT0. A fourth sense amplifier control signal AMP4 is provided by the output of an AND gate 386, whose inputs are driven by an inverted version of the address bit A[3] and the way hit signal HIT1. In the aforementioned embodiment of the invention in which the cache memory system 208 does not include interleaving, the sense amplifier control circuit 320 is not required. Instead, way hit signals (such as HIT0, HIT1, HIT2 and HIT3) could be utilized to directly control banks of sense amplifiers in corresponding ways.

As shown in the example of FIG. 6B, upon detecting valid read data in the even bank 300 of WAY 0, the tag address comparator asserts the way hit signal HIT0. In the disclosed embodiment of the invention, the tag RAM 310 is relatively fast with respect to the data bank memory. The HIT0 signal can therefore be asserted several nanoseconds prior to time C. This allows the sense amplifier control signal AMP2 to be asserted with enough timing margin to allow the sense amplifier(s) 352 of the even memory bank 300 to be enabled and provide addressed quad-word to the processor data bus PD at time C.

According to either the Pentium® Burst Sequence or the Linear Burst, if the quad-word provided at time C is in the even memory bank 300, the next quad-word provided to the processor data bus PD is retrieved from the odd memory bank 302. At some point between time C and time D, the sense amplifier control signal AMP1 is asserted to enable the sense amplifier(s) 352 of the odd memory bank 300, allowing the second quad-word to be provided at time D. Incrementation of the address bit A[3] also causes control signal AMP2 to be deasserted during the time control signal AMP1 is asserted. The sense amplifier control signals AMP1 and AMP2 are alternately asserted for the remainder of the burst read cycle, after which time both remain deasserted pending the next hit to WAY 0.

Way hit signal HIT1 (as well as any other way hit signals) are maintained deasserted throughout the entire burst read cycle to WAY 0. In this manner, only sense amplifier control signals AMP1 and AMP2 can be asserted while the sense amplifier control signals AMP3 and AMP4 must remain deasserted. Only the sense amplifiers 352 of WAY 0 can thereby be selectively activated and power is not consumed needlessly by the sense amplifiers 352 in the other ways.

Thus, a multiple-way cache memory system has been described that incorporates circuitry for selectively enabling the sense amplifiers in a given memory bank only when the memory bank contains data that is being accessed. In the disclosed embodiment of the invention, each even and odd bank of memory incorporates a bank of sense amplifiers that is enabled by a separate sense amplifier control signal. The sense amplifier control signal for each memory bank is generated from tag RAM read hit information and read address data. Preferably, no more than one bank of sense amplifiers is enabled at a time. Power consumption in the cache memory system is thereby greatly reduced.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A cache memory system for use in a computer having an address bus and a data bus, the cache memory system comprising:

an array of data memory having address inputs and forming a cache address space, said array of data memory partitioned into an even memory bank and an odd memory bank for storing and providing even and odd interleaved data, said even memory bank having a first bank of at least one sense amplifier enabled by a first control input signal and said odd memory bank having a second bank of at least one sense amplifier enabled by a second control input signal;

a tag memory coupled to the address bus for storing labels corresponding to the contents of said array of data memory; and a tag address comparator, coupled to the address bus and said tag memory, for comparing stored labels to specified address bits of the address bus to determine if said array of data memory contains data corresponding to a given read address, said tag address comparator providing a memory array hit signal that is asserted when said memory array contains data corresponding to a given read address, the memory array hit signal being otherwise deasserted, wherein the first control input signal for said first bank of at least one sense amplifier is asserted responsive to the memory array hit signal and responsive to access to the even interleaved data, and wherein the second control input signal is typically deasserted when the first control input signal is asserted.

2. The cache memory system of claim 1, further comprising:

at least one additional array of data memory partitioned into an equal number of additional even and odd memory banks, wherein each of said additional even and odd memory banks includes a bank of at least one sense amplifier enabled by a separate additional control input signal, said array of data memory forming a first way and each of said at least one additional array(s) of data memory forming an additional way, said tag address comparator providing additional memory array hit signals, one of which is asserted when a corresponding one of said additional way(s) contains data corresponding to a given read address, all memory array hit signals being otherwise deasserted, wherein the control input signal for said bank of at least one sense amplifier in each of said additional even memory banks is asserted responsive to a corresponding one of the additional memory array hit signals and responsive to access to the even interleaved data, and wherein typically only one of said bank of at least one sense amplifier is enabled at a time.

3. The cache memory system of claim 2, having a total of two ways.

4. The cache memory system of claim 2, having a total of four ways.

5. The cache memory system of claim 1, wherein the interleaved data is accessed by a burst operation.

6. A cache memory system for use in a computer having an address bus and a data bus, the cache memory system comprising:

at least two arrays of data memory forming at least two ways having address inputs and forming a cache address space, each of said ways having a bank of at least one sense amplifier enabled by a separate control input signal;

a tag memory coupled to the address bus for storing labels corresponding to the contents of said at least two ways; and a tag address comparator, coupled to the address bus and said tag memory, for comparing stored labels to specified address bits of the address bus to determine if said at least two ways contain data corresponding to a given read address, said tag address comparator providing way hit signals corresponding to each of said at least two ways, one of the way hit signals being asserted when a corresponding way contains data corresponding to a given read address, the way hit signal being otherwise deasserted, wherein the control input signal for said bank of at least one sense amplifier in each of said at least two ways is asserted responsive to a corresponding way hit signal, and wherein the typically only one of said bank of at least one sense amplifier is enabled at a time.

7. The cache memory system of claim 6, having a total of two ways.

8. The cache memory system of claim 6, having a total of four ways.

9. A computer system, comprising:

a processor coupled to a processor bus having address and data portions;

a memory controller coupled to the processor bus and further coupled to a system bus;

a main memory device coupled to the processor bus and said memory controller;

a mass data storage device coupled to the system bus for providing data to said processor and said main memory device; and an interleaved cache memory system coupled to the processor bus for providing said processor with an intermediate source of frequently accessed data stored in said main memory, said cache memory system providing access to the duplicated data following commencement of a read cycle, said cache memory system comprising:

an array of data memory having address inputs and forming a cache address space, said array of data memory partitioned into an even memory bank and an odd memory bank for storing and providing even and odd interleaved data, said even memory bank having a first bank of at least one sense amplifier enabled by a first control input signal and said odd memory bank having a second bank of at least one sense amplifier enabled by a second control input signal;

a tag memory coupled to the processor address bus for storing labels corresponding to the contents of said array of data memory; and a tag address comparator, coupled to the processor address bus and said tag memory, for comparing stored labels to specified address bits of the processor address bus to determine if said array of data memory contains data corresponding to a given read address, said tag address comparator providing a memory array hit signal that is asserted when said memory array contains data corresponding to a given read address, the memory array hit signal being otherwise deasserted, wherein the first control input signal for said first bank of at least one sense amplifier is asserted responsive to the memory array hit signal and responsive to access to the even interleaved data, and wherein the second control input signal is typically deasserted when the first control input signal is asserted.

10. The computer system of claim 9, wherein said cache memory system further comprises at least one additional array of data memory partitioned into an equal number of additional even and odd memory banks, wherein each of said additional even and odd memory banks includes a bank of at least one sense amplifier enabled by a separate additional control input signal, said array of data memory forming a first way and each of said at least one additional array(s) of data memory forming an additional way, said tag address comparator providing additional memory array hit signals, one of which is asserted when a corresponding one of said additional way(s) contains data corresponding to a given read address, all memory array hit signals being otherwise deasserted, wherein the control input signal for said bank of at least one sense amplifier in each of said additional even memory banks is asserted responsive to a corresponding one of the additional memory array hit signals and responsive to access to the even interleaved data, and wherein typically only one of said bank of at least one sense amplifier is enabled at a time.

11. The computer system of claim 10, wherein the interleaved data is accessed by a burst operation.

12. The computer system of claim 10, wherein the cache memory system includes a total of two ways.

13. The computer system of claim 10, wherein the cache memory system includes a total of four ways.

14. A method for selectively enabling sense amplifiers in the data memory arrays of an interleaved cache memory system having a tag memory for storing labels and an tag address comparator, the method comprising the steps of:

utilizing the tag address comparator to compare stored labels in the tag memory to specified address bits of an address bus to determine if the memory arrays contain data corresponding to a given read address;

providing a memory array hit signal that is asserted when a memory array in the cache memory system contains data corresponding to a read address, the memory array hit signal being otherwise deasserted; and, responsive to assertion of a corresponding memory array hit signal, enabling the sense amplifiers only in the memory array that contains data corresponding to the read address.

15. The method of claim 14, wherein said step of enabling the sense amplifiers is contingent upon both the corresponding memory array hit signal being asserted and a particular address bit being asserted, the particular address bit specifying an even or odd portion of the memory array.

* * * * *

UNITED STATES PATENT AND TRADEMARK OFFICE
CERTIFICATE OF CORRECTION

PATENT NO. : 5,848,428
DATED : 12/8/98
INVENTOR(S) : MICHAEL J. COLLINS

It is certified that error appears in the above-identified patent and that said Letters Patent is hereby corrected as shown below:

Claim 6, column 17, line 48, please delete "the".

Claim 6, column 17, line 48, please delete "bank" and insert --banks--.

Signed and Sealed this

Twentieth Day of April, 1999

Attest:

Q. TODD DICKINSON

Attesting Officer

Acting Commissioner of Patents and Trademarks